(No Model.)
W. M. HANEY.
MILK OR CREAM CARRIER.
No. 280,308. Patented June 26, 1883.
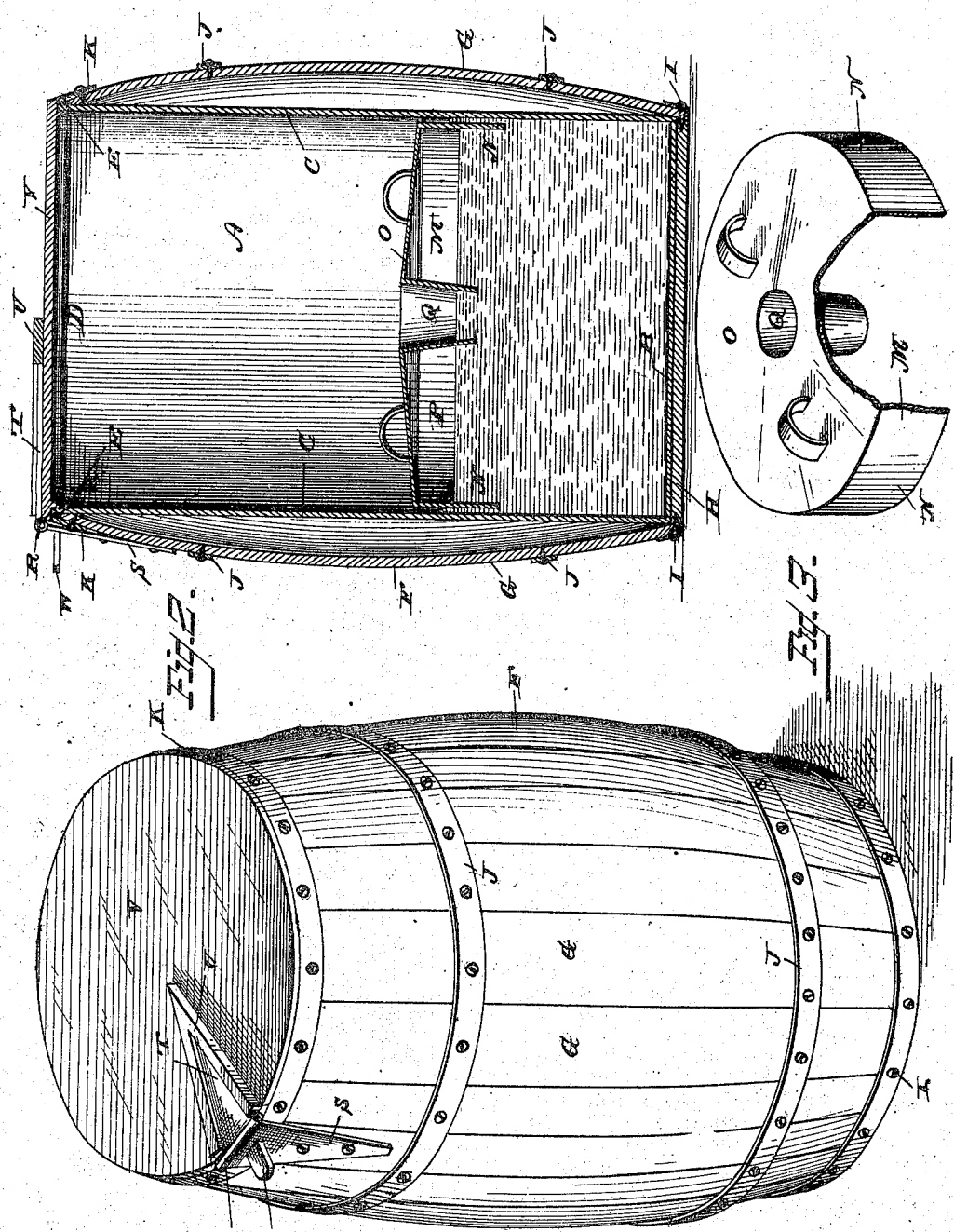
WITNESSES
INVENTOR

UNITED STATES PATENT OFFICE.

WILLIAM M. HANEY, OF BELLEVUE, IOWA.

MILK OR CREAM CARRIER.

SPECIFICATION forming part of Letters Patent No. 280,308, dated June 26, 1883.

Application filed April 16, 1883. (No model.)

*To all whom it may concern:*

Be it known that I, WILLIAM M. HANEY, a citizen of the United States, residing at Bellevue, in the county of Jackson and State of Iowa, have invented a new and useful Milk and Cream Carrier, of which the following is a specification, reference being had to the accompanying drawings.

This invention relates to cans for transporting milk, cream, and the like, and has for its object to provide a simple, inexpensive, and durable can possessing superior advantages, in point of general efficiency, over those now in use.

In the drawings, Figure 1 is a perspective view of a can or vessel embodying my improvements. Fig. 2 is a vertical sectional view of the same. Fig. 3 is a detail view, in perspective, of the float.

Referring to the drawings, A designates the interior can of my improved transporting-vessel, which comprises a bottom, B, and perpendicular sides C, and has an open mouth, D. This can A is preferably cylindrical in form, and is provided with a vertical wall, E, extending around its mouth.

F is the outer casing, which is formed of wood and with a central bulge, like a barrel. This casing comprises the upright staves G, that are united to a bottom board, H, by screws I, and are retained in position by encircling hoops or bands J, a hoop, K, being provided at the top edge of the said casing. When the can A is placed inside the wood casing, it will rest on the bottom of the latter, and an air-space, L, will be formed between the vessels A and F, caused by the bulge of the latter, this space being greater at the center and gradually decreasing toward the top and bottom. The flange E and the hoop K are then secured together by soldering or other suitable means, so that no milk or cream will escape into the air-space, and the two vessels will be secured neatly together.

M is a float, which conforms to the cylindrical shape of the inner can, A, and comprises perpendicular sides N and a pitched top plate, O, to form an air-space, P. In the center of this top O is arranged a downwardly-extending tubular opening, Q, through which the contents of the can are poured, and the float will rise as the can is filled.

R is a hinge, that has one half, S, secured to the casing F, while its other half, T, is slipped into a sheath, U, on the cover V. By elevating the cover to a perpendicular position it can be disconnected from the hinge and removed. The portion S of the hinge is provided with a stop lug or shoulder, W, that will limit the movement of the cover and support it when open.

The operation and advantages of my invention are obvious. By reason of the bulge in the outer wood casing an air-chamber is formed that will serve to retain the contents of the can at the proper temperature. The bulge also enables the inner can to be securely arranged in connection with the outer casing at the top and bottom, and yet preserve the central air-space.

I claim as my invention—

The combination of the outer wood casing comprising the bulged staves, the bottom board, to which the staves are connected, the encircling-bands J, and the top band or hoop, K, the inner can having perpendicular sides arranged in the casing so that an air-space is formed between the sides of the can and the casing, the hoop K and sides of the can being secured together, and the cover hinged to the outer casing, as set forth.

In testimony that I claim the foregoing as my own I have hereto affixed my signature in presence of two witnesses.

WILLIAM MADISON HANEY.

Witnesses:
F. W. PATTEN,
JOHN BRUCHEDING.